United States Patent
Depka et al.

(10) Patent No.: US 10,933,558 B2
(45) Date of Patent: Mar. 2, 2021

(54) METHOD FOR PRODUCING A COMPONENT FROM MAX PHASES

(71) Applicant: SIEMENS AKTIENGESELLSCHAFT, Munich (DE)

(72) Inventors: Timo Depka, Bochum (DE); Arturo Flores Renteria, Berlin (DE); Britta Stöhr, Berlin (DE); Michael Ott, Mülheim an der Ruhr (DE); Sebastian Piegert, Lübbenau (DE)

(73) Assignee: SIEMENS AKTIENGESELLSCHAFT

( * ) Notice: Subject to any disclaimer, the term of this patent is extended or adjusted under 35 U.S.C. 154(b) by 123 days.

(21) Appl. No.: 15/556,397

(22) PCT Filed: Mar. 21, 2016

(86) PCT No.: PCT/EP2016/056100
§ 371 (c)(1),
(2) Date: Sep. 7, 2017

(87) PCT Pub. No.: WO2016/156082
PCT Pub. Date: Oct. 6, 2016

(65) Prior Publication Data
US 2018/0043570 A1    Feb. 15, 2018

(30) Foreign Application Priority Data
Mar. 31, 2015 (DE) .......................... 102015205787.9

(51) Int. Cl.
| | | |
|---|---|---|
| *B28B 1/00* | (2006.01) | |
| *B33Y 10/00* | (2015.01) | |
| *C04B 35/653* | (2006.01) | |
| *C04B 35/56* | (2006.01) | |
| *B33Y 70/00* | (2020.01) | |
| *C01B 32/90* | (2017.01) | |

(52) U.S. Cl.
CPC .............. *B28B 1/001* (2013.01); *B33Y 10/00* (2014.12); *B33Y 70/00* (2014.12); *C01B 32/90* (2017.08); *C04B 35/5607* (2013.01); *C04B 35/5615* (2013.01); *C04B 35/653* (2013.01); *C04B 2235/3817* (2013.01); *C04B 2235/5436* (2013.01); *C04B 2235/6026* (2013.01); *C04B 2235/665* (2013.01)

(58) Field of Classification Search
CPC .............. C04B 35/653; C04B 35/5615; C04B 35/5607; C04B 2235/665; C04B 2235/6026; C04B 2235/5436; C04B 2235/3817; B29C 64/153; B29C 64/165; B28B 1/001; C01B 32/90
See application file for complete search history.

(56) References Cited

U.S. PATENT DOCUMENTS

| | | | |
|---|---|---|---|
| 2009/0047165 A1* | 2/2009 | Syvanen | B22F 3/105 420/61 |
| 2013/0228302 A1 | 9/2013 | Rickenbacher et al. | |
| 2013/0280547 A1* | 10/2013 | Brandl | B22F 3/1055 428/565 |
| 2015/0098546 A1* | 4/2015 | Xu | G21C 3/32 376/438 |

FOREIGN PATENT DOCUMENTS

| | | |
|---|---|---|
| CN | 103771837 A | 5/2014 |
| DE | 102009036951 A1 | 2/2011 |
| EP | 2589449 A1 | 5/2013 |
| JP | 2014055074 A | 3/2014 |

OTHER PUBLICATIONS

Non-English Korean Office Action for Application No. 10 2017 7030716, dated Nov. 8, 2018.
Williams John D et al: "Advances in modeling the effects of selected parameters on the SLS process"; 1998; Rapid Prototyping Journal; vol. 4 ISS 2 pp: 90-100, ISSN 1355-2546; http://dx.doi.org/10.1108/13552549810210257; 1998.
"Tip-Reparatur mittels neuer Schaufelspitze aus einer MAX-Phasen-Keramik", Prior Art Publishing; XP040638421; http://dx.doi.org/10.4421/PAPDEOTT003395; 2014.
Pasumarthi V et al: "Reaction synthesis of Ti3SiC2 phase in plasma sprayed coating"; Journal of Alloys and Compounds, Elsevier Sequoia, Lausanne, CH; Bd. 484, Nr. 1-2, pp. 113-117; XP026586408; ISSN: 0925-8388, DOI: 10.1016/J.JALLCOM.2009.04.079; 2009.
PCT International Search Report for PCT International Application No. PCT/EP2016/056100 dated Jul. 4, 2016.

(Continued)

*Primary Examiner* — Joseph S Del Sole
*Assistant Examiner* — Mohamed K Ahmed Ali
(74) *Attorney, Agent, or Firm* — Schmeiser, Olsen & Watts LLP

(57) ABSTRACT

For the first time, components can be produced from MAX-phases due to the use of an additive production method. A method for producing a component from MAX phases, in particular from $Ti_3SiC_2$ and/or $Cr_2AlC$, in which an additive manufacturing process is disclosed. Powder is applied layer by layer and densified, the grain sizes of the powder lying at 10 μm to 60 μm, in which the scanning speed between the energy beam of the laser or electron beam and substrate with powder lies between 400 mm/s and 2000 mm/s, in particular at 1000 mm/s to 1500 mm/s, in which the power output is between 80 W and 250 W, in particular is 100 W to 170 W, in which a spot size of the energy beam lies between 30 μm and 300 μm.

9 Claims, No Drawings

(56) References Cited

OTHER PUBLICATIONS

"Selective laser sintering," Wikipedia.com, https://en.wikipedia.org/wiki/Selective_laser_sintering (last accessed Aug. 31, 2020).
"What's the Difference Between SLS and SLM?" RapidMade, https://www.rapidmade.com/rapidmade-blog/2014/6/30/ycjnxytypt8n85gqutk5wj67cmx4t7 (last accessed Jul. 1, 2020).
Non-English Chinese Office Action for Application No. 201680019833.X, dated Mar. 19, 2020.
Wang, Xiuzhan: Exploration and Progress of 3D Printing Technologyin Manufacture of Aero-engine Fuel System; pp: 48-51; Sep. 30, 2014;.
Non-English Chinese Office Action for Application No. 201680019833.X, dated Nov. 20, 2020.

* cited by examiner

METHOD FOR PRODUCING A COMPONENT FROM MAX PHASES

CROSS-REFERENCE TO RELATED APPLICATIONS

This application claims priority to PCT Application No. PCT/EP2016/056100, having a filing date of Mar. 21, 2016, based off of German application No. DE 102015205787.9 having a filing date of Mar. 31, 2015, the entire contents of which are hereby incorporated by reference.

FIELD OF TECHNOLOGY

The following invention relates to a method for producing a component from MAX phases by means of an additive manufacturing process.

BACKGROUND

MAX phases are stoichiometric phases which, on the basis of the properties, are to be classified between metals and ceramics. On the one hand (metallic), they display good thermal conductivity and high thermal shock resistance, on the other hand (ceramic) they display extraordinary stiffness, corrosion resistance, high abrasion resistance and a low density. In addition, even at 1473° K.-1573° K., certain MAX phases still display significant creep and fatigue resistance.

These properties make the MAX phases of interest for high-temperature applications such as in gas turbines. Thus, blade tips may be reconditioned and armored with MAX phases. The low density and the resistances at high temperatures also make them appear to be suitable however for being used as materials for the blades.

Existing production routes:

1. Synthesizing the powdered basic constituents (transition metal+element of group A+carbon/nitrogen) by hot-isostatic pressing a workpiece is then produced from the solid body by machining limits in size and form.
2. A three-step process from a powder produced according to 1. of the correct stoichiometric composition: 3D printing of a green body (MAX phase+binder)+cold-isostatic pressing+sintering→an even more complex production route to create the powder+a complex three-step technique to ensure the final shaping.

The shaping of the MAX phases into components and the production are complex and laborious.

SUMMARY

An aspect relates to solving the aforementioned problem.

It is proposed to produce the MAX phases in near net shape or in net shape by means of selective laser melting (SLM).

This can be performed by two routes:
1) by means of mixed powders of the individual components of the MAX phase; or
2) by means of powder with the correct stoichiometry of the MAX phase.

The process data for the production process by means of the SLM process are as follows for the MAX phases, specifically however for $Ti_3SiC_2$ and $Cr_2AlC$: the grain size of the powder lies at 10 μm-60 μm, either gas-atomized or ground.

The following is proposed as a possible process window:
scanning speed: 400-2000 mm/s, preferably 1000-1500 mm/s
power output: 80-250 W, preferably 100-170 W
spot size: 30-300 μm.

In particular, a laser is used as the energy beam.

The processing of the alloy under a shielding gas leads to a low oxygen component in the matrix.

The invention claimed is:

1. A method for producing a component from at least one MAX phase, from Ti3SiC2 and/or Cr2AlC, in which an additive manufacturing process is used, in which a powder is applied layer by layer and densified, grain sizes of the powder lying at 10 μm to 60 μm, in which a scanning speed between an energy beam of a laser or an electron beam and a substrate with the powder lies between 400 mm/s and 2000 mm/s in which a power output is between 80 W and 250 W, in which a spot size of the energy beam lies between 30 pm and 300 μm wherein the at least one MAX phase is produced by selective laser melting.

2. The method as claimed in claim 1, in which a production of the powder is by a gas atomization.

3. The method as claimed in claim 1, in which a production of the powder is by a grinding process.

4. The method for producing the component from the at least one MAX phase as claimed in claim 1 is carried out under a shielding gas atmosphere.

5. The method for producing the component from the at least one MAX phase as claimed in claim 1, wherein the scanning speed between the energy beam of the laser or the electron beam and the substrate with the powder lies between 1000 mm/s and 1500 mm/s.

6. The method for producing the component from the at least one MAX phase as claimed in claim 1, wherein the power output is between 100 W and 170 W.

7. A method for producing a component from at least one MAX phase, from $Ti_3SiC_2$ and/or $Cr_2AlC$, in which an additive manufacturing process is used, in which a powder is applied layer by layer and densified, grain sizes of the powder lying at 10 μm to 60 μm, in which a scanning speed between an energy beam of a laser and a substrate with the powder lies between 400 mm/s and 2000 mm/s in which a power output is between 80 W and 250 W, in which a spot size of the energy beam lies between 30 μm and 300 μm, wherein the at least one MAX phase are produced by selective laser melting.

8. The method for producing the component from the at least one MAX phase of claim 7, wherein the MAX phase are is produced by means of mixed powders of the individual components of the at least one MAX phase.

9. The method for producing the component from the at least one MAX phase of claim 7, wherein the MAX phase are is produced by means of the powder having the correct stoichiometry of the at least one MAX phase.

* * * * *